(12) United States Patent
Pinton et al.

(10) Patent No.: US 8,590,396 B2
(45) Date of Patent: Nov. 26, 2013

(54) VELOCIMETER AND METHOD FOR MEASURING THE SPEED OF FLOW OF AN ELECTRICALLY CONDUCTING FLUID

(75) Inventors: Jean-Francois Pinton, Collonges au Mont d'Or (FR); Nicolas Plihon, Lyons (FR); Gautier Verhille, Marseilles (FR); Sophie Miralles, Lyons (FR)

(73) Assignee: Ecole Normale Superieure de Lyon, Lyons (FR)

( * ) Notice: Subject to any disclaimer, the term of this patent is extended or adjusted under 35 U.S.C. 154(b) by 0 days.

(21) Appl. No.: 13/700,921

(22) PCT Filed: May 26, 2011

(86) PCT No.: PCT/EP2011/058683
§ 371 (c)(1),
(2), (4) Date: Feb. 11, 2013

(87) PCT Pub. No.: WO2011/151257
PCT Pub. Date: Dec. 8, 2011

(65) Prior Publication Data
US 2013/0139609 A1    Jun. 6, 2013

(30) Foreign Application Priority Data
Jun. 1, 2010 (FR) .................................... 10 54250

(51) Int. Cl.
*G01F 1/58* (2006.01)
(52) U.S. Cl.
USPC .................. 73/861.11; 73/861.08; 137/13
(58) Field of Classification Search
None
See application file for complete search history.

(56) References Cited

U.S. PATENT DOCUMENTS

| | | | |
|---|---|---|---|
| 3,824,456 | A | 7/1974 | Wiegand |
| 4,255,976 | A | 3/1981 | Formato |
| 4,346,605 | A | 8/1982 | Skladzien et al. |
| 5,426,983 | A | 6/1995 | Julius et al. |
| 5,540,107 | A | 7/1996 | Silverman et al. |
| 6,321,766 | B1 | 11/2001 | Nathenson |
| 2008/0252287 | A1 | 10/2008 | Thess et al. |

FOREIGN PATENT DOCUMENTS

| | | |
|---|---|---|
| DE | 3347190 A1 | 7/1985 |
| EP | 0 149 771 B1 | 12/1984 |
| EP | 0 443 937 A1 | 8/1991 |
| FR | 2 081 835 | 12/1971 |
| FR | 2 136 712 | 12/1972 |
| FR | 2 481 798 | 11/1981 |
| FR | 2 705 450 | 11/1994 |
| WO | 2007/097713 A1 | 8/2007 |

OTHER PUBLICATIONS

"EcoSpin—Magnetic Sensors" *Baumer*, pp. 1-4, www.baumerelectric.com/en/211.html (Dec. 2007) English Translation Provided.

(Continued)

*Primary Examiner* — Harshad R Patel
(74) *Attorney, Agent, or Firm* — Occhiuti & Rohlicek LLP

(57) ABSTRACT

This velocimeter for measuring the speed of flow of an electrically conducting fluid comprises: —two sensors (16, 19) disposed in such a way that, in the absence of flow of the electrically conducting fluid (4), the difference between the current strengths measured by the two sensors (16, 19) is non zero, —a processing unit (18) is able to calculate the speed of flow of the fluid in a direction parallel to the first measurement direction (7) on the basis of the difference between the current strengths measured by the two sensors (16, 19).

11 Claims, 6 Drawing Sheets

(56) References Cited

OTHER PUBLICATIONS

B Horner et al. "A multi-sensor induction flowmeter reducing errors due to non-axisymmetric flow profiles" *Meas. Sci. Technol.*, 7(3): 354-360 (Mar. 1996) Abstract Only.

Lasgorceix et al. "Souffleries à Jets de Plasmas Raréfiés" *J. Phy.s Colloques*, 51(C5): pp. C5-441to C5-446 (Sep. 1990) English Abstract Provided.

"Magnetic Induction Tomography for Medical Applications—Moscow"; *CSTL* (Nov. 2007).

"GMR magnetic sensors vie with the Hall effect"; *Mesures*,750: pp. 40-43 (Dec. 2002).

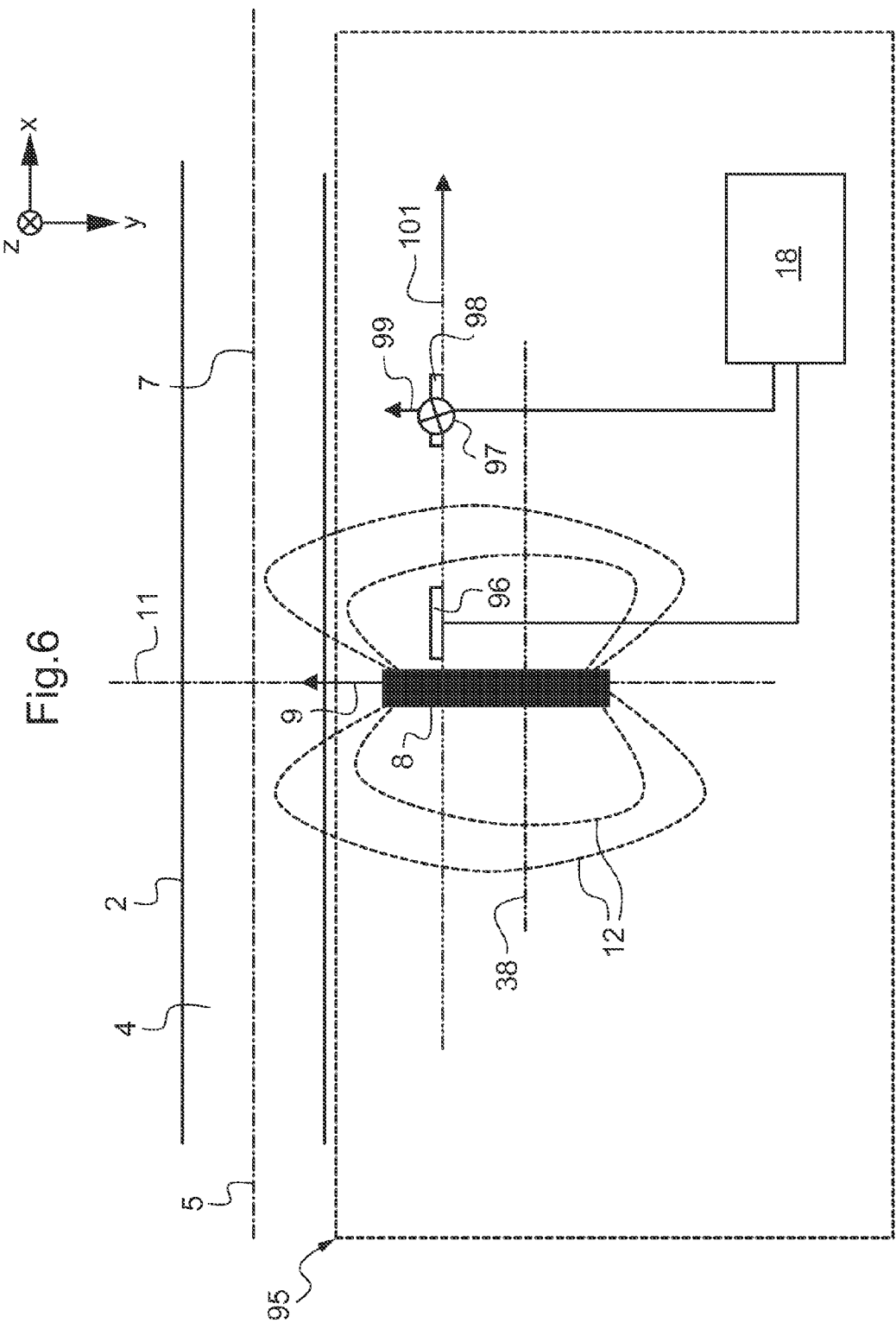

VELOCIMETER AND METHOD FOR MEASURING THE SPEED OF FLOW OF AN ELECTRICALLY CONDUCTING FLUID

CROSS-REFERENCE TO RELATED APPLICATIONS

This application is the National Stage of International Application No. PCT/EP2011/058683, filed on May 26, 2011, which claims the benefit of the priority date of French Application No. 1054250, filed on Jun. 1, 2010. The content of these applications is hereby incorporated by reference in its entirety.

FIELD OF DISCLOSURE

The invention concerns a velocimeter for measuring the speed of flow of an electrically conducting fluid and a method of measuring the speed of flow of an electrically conducting fluid.

BACKGROUND

An electrically conducting fluid is a fluid containing mobile charge carriers. For example, liquid sodium and liquid gallium are electrically conducting fluids, the conductivity of which is of the order of $10^6$ S·m$^{-1}$, Plasmas are also conducting fluids. The measurement of the speed of flow of electrically conducting fluids is notably encountered in the iron and steel industry in the control of production lines. These measurements are also encountered in the liquid metal cooling circuits of nuclear power stations. They can equally be encountered in plasma processes (depollution, etching or deposition of thin layers), The applicant knows of a velocimeter including;
   a primary magnetic field source, the field lines of which pass through the electrically conducting fluid, and
   first and second magnetic field sensors each measuring the intensity of the magnetic field in the same first measurement direction.

By measurement direction is meant a set of collinear vectors oriented in the same direction.

In the absence of flow of the fluid, the field lines of the primary magnetic field source have an initial shape. The sensors then measure an intensity of the magnetic field at zero speed of flow. When the fluid is flowing, the movement of the mobile charge carriers deforms the field lines passing through the fluid. The intensity measured by the sensors therefore varies with the speed of flow of the fluid. To increase the sensitivity of the measurements, in known velocimeters, the first and second sensors are disposed symmetrically with respect to a plane of symmetry of the primary magnetic field source and the intensities measured by these two sensors are added. A plane of symmetry of the primary magnetic field source is a plane of symmetry for the lines of the primary magnetic field.

Moreover, the sensors are placed as close as possible to the source so as to be more sensitive to the primary magnetic field than to other magnetic fields. Despite these precautions, known velocimeters remain sensitive to interference caused by an exterior magnetic field such as the terrestrial magnetic field or a magnetic field radiated by nearby electrical equipment. Moreover, the linearity of known velocimeters is open to improvement.

By "linearity" is meant the maximum difference between the ideal linear characteristic curve that links the measured speed to the output signal of the velocimeter and its real characteristic curve.

The invention aims to resolve one or more of these drawbacks.

It therefore consists in a velocimeter for measuring the speed of flow of an electrically conducting fluid in which:
   the two sensors are disposed so that, in the absence of flow of the electrically conducting fluid, the difference between the intensities measured by the two sensors is not zero, and
   the velocimeter includes a processing unit adapted to calculate the speed of flow of the fluid in a direction parallel to the first measurement direction from the difference between the intensities measured by the two sensors.

Using the difference between the measured intensities makes it possible to improve the linearity of the velocimeter, as explained hereinafter. Moreover, this differential measurement makes it possible to limit the dependence of the measured speed on:
   temporal variations of the exterior magnetic field,
   the field induced by speed gradients in the presence of the exterior magnetic field, and
   space and time variations of the magnetic field induced by the gradients.

Embodiments of this velocimeter may have one or more of the following features:
   the two sensors are disposed so that, in the absence of flow of the electrically conducting fluid, the difference between the intensities of the primary magnetic field measured by the two sensors is greater than the smaller of those intensities,
   the source has a magnetization axis and the two sensors are disposed on the same side of a plane containing the magnetization axis,
   the first sensor is situated at a distance D16 from the primary magnetic field source and the second sensor is situated at a distance $D19_1$ from the primary magnetic field source so that the absolute value of the difference between the distances D16 and $D19_1$ is greater than the smaller of the distances D16 and $D19_1$,
   a magnetic disturber is disposed closer to one sensor than the other sensor so that in the absence of flow of the fluid, the intensity measured by the first sensor is at least twice the intensity measured by the second sensor,
   the first and second sensors are disposed at equal distances from the primary field source,
   the velocimeter includes a third magnetic field sensor, the third sensor being adapted to measure the magnetic field in the first measurement direction, the third sensor being disposed relative to the source so that the intensities measured by the first sensor and the third sensor are equal in the absence of flow, and the processing unit is adapted to calculate the speed of flow of the fluid from:
      the difference between the intensities measured by the first and second sensors,
      the difference between the intensities measured by the second and third sensors, and
      the sum of these differences,
   the primary magnetic field source is an alternating magnetic field source,
   the primary magnetic field is modulated by a predetermined modulating signal and the intensities measured by the sensors are demodulated with the aid of that modulating signal,
   the velocimeter includes a fourth magnetic field sensor and a fifth magnetic field sensor measuring the intensity of the magnetic field in at least one second measurement direction intersecting the first measurement direction, and the processing unit is adapted to calculate the speed of flow of the fluid in the second measurement direction of the fourth and fifth sensors from the difference between the intensities measured by the fourth and fifth sensors.

These embodiments of the velocimeter also have the following advantages:
  placing the first and second sensors so that the difference between the intensities of the primary magnetic field measured by these sensors is greater than the lower of these intensities makes it possible to improve the linearity of the velocimeter whilst preserving the sensitivity of the sensor nearest the source;
  placing the two sensors on the same side makes it possible to move them closer together and to compensate more effectively the non-linearity caused by the gradient of the speed of the flow;
  adding a magnetic disturber makes it possible to produce more compact velocimeters since it is then no longer necessary to place the second sensor far from the source so that it measures a primary magnetic field intensity that is negligible compared to the intensity of the primary magnetic field measured by the first sensor;
  adding a third sensor measuring the same magnetic field as the first sensor makes it possible to increase the sensitivity of the velocimeter;
  modulation of the primary magnetic field radiated by the source, coupled with demodulation of the intensity measured by the sensors, makes it possible to set up synchronous detection limiting the consequences of noise;
  adding third, fourth and fifth two-axis sensors makes it possible to measure the speed of flow of the fluid in three non-colinear directions in space.

SUMMARY

The invention also concerns a method of measuring the speed of flow of an electrically conducting fluid including the emission of a primary magnetic field, the field lines of which pass through the electrically conducting fluid, this method including:
  the measurement of the intensity of the magnetic field in a first measurement direction by two sensors disposed so that, in the absence of flow of the electrically conducting fluid, the difference between the intensities measured by the two sensors is not zero, and
  the calculation of the speed of flow from the difference between the intensities measured by the two sensors

BRIEF DESCRIPTION OF THE FIGURES

The invention will be better understood on reading the following description, provided by way of nonlimiting example only and given with reference to the drawings, in which:

FIG. 6 is a diagrammatic illustration in side view of a third variant of the velocimeter from FIGS. 1 and 2.

DETAILED DESCRIPTION

In these figures, the same references are used to designate the same elements. In the remainder of this description, features and functions well known to a person skilled in the art are not described in detail.

Figure 1:
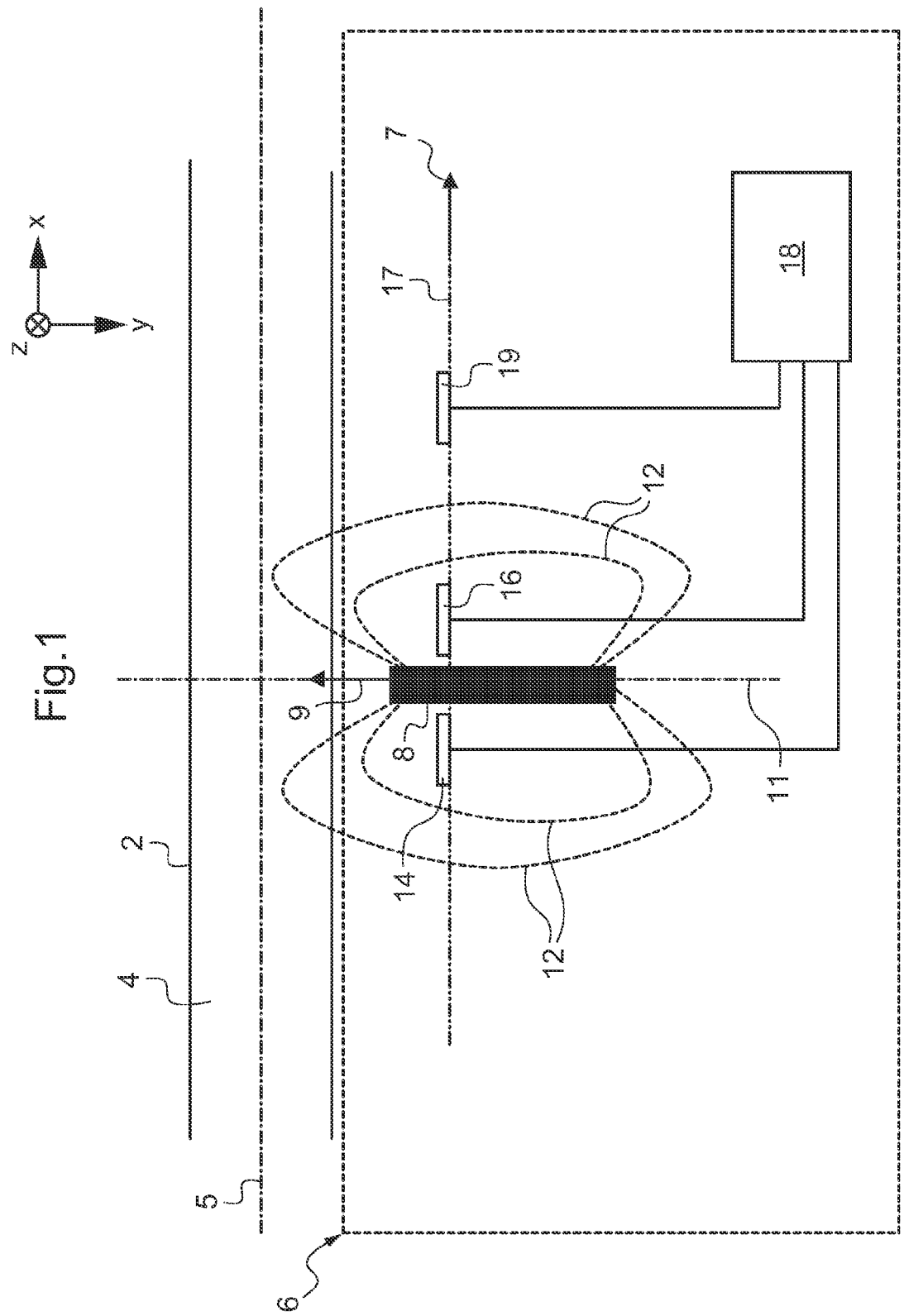
FIG. 1 is a diagrammatic illustration in side view of a velocimeter in the vicinity of a pipe receiving a conducting fluid, the speed of flow of which is zero.

FIG. 1 is oriented by an orthonomic frame of reference (x, y, z) in which the direction x is called horizontal and the direction y is called vertical. It shows a pipe 2. The walls of the pipe 2 are permeable to the magnetic field. This pipe 2 is used to guide a conducting fluid 4 along a flow direction 5 parallel to the direction x. For example, the fluid 4 has a conductivity greater than $10 \, S \cdot m^{-1}$ and preferably greater than 100 or 1000 $S \cdot m^{-1}$. Here the fluid 4 is a liquid such as liquid gallium, the electrical conductivity of which is equal to $6.78*10^6 \, S \cdot m^{-1}$.

FIG. 1 illustrates the situation in which there is no flow of the fluid 4 in the pipe 2.

The speed of flow of the fluid 4 is measured by a velocimeter 6. For example, the velocimeter 6 is pressed onto the exterior periphery of the pipe 2 rather than accommodated in a depression on the interior of the pipe 2. The velocimeter 6 includes a primary magnetic field source 8. For example, the source 8 is a permanent magnet having a plane of symmetry parallel to the directions y and z. To be more precise, in this case, the source 8 has an axis of symmetry contained within the plane of symmetry.

Here, the source 8 radiates a magnetic field greater than or equal to 0.2 Tesla. The source 8 has a magnetic moment 9 carried by a magnetization axis 11 parallel to the direction y. The magnetization axis 11 coincides with the axis of symmetry of the source 8. The source 8 is disposed so that the field lines 12 of the primary magnetic field pass through the fluid 4. The field lines 12 are symmetrical with respect to a plane passing through the axis 11 and parallel to the directions y and z. For example, the source 8 is a cylinder or a parallelogram. The source 8 is disposed a few centimeters from the pipe 2.

To simplify the description, this first embodiment is described in the particular situation in which the velocimeter 6 measures the speed of flow in only one measurement direction 7. Embodiments of a velocimeter adapted to measure the speed of flow in a plurality of measurement directions are described later. Here, the velocimeter 6 includes two single-axis sensors 14 and 16 adapted to measure the intensity of a magnetic field in the same measurement direction 7 parallel to the direction x. The sensors 14 and 16 are aligned on an axis 17 perpendicular to the axis 11, for example. The sensors 14 and 16 are situated on respective opposite sides of the source 8 at distances D14 and D16, respectively. Here, the sensors 14 and 16 are disposed so that in the absence of flow of the fluid 4, the intensities measured by the sensors are equal. To this end, the sensors 14 and 16 are disposed symmetrically with respect to the plane passing through the axis 11 and parallel to the directions y and z. The distances D14 and D16 are therefore equal. For example, the sensors 14 and 16 are Hall-effect probes.

A third single-axis sensor 19 measures the intensity of a magnetic field in the same measurement direction as the sensors 14 and 16. The sensor 19 is aligned with the sensors 14 and 16 on the axis 17, for example. The sensor 19 is disposed relative to the source 8 so that in the absence of flow of the fluid 4 in the pipe 2, the difference between the intensities of the magnetic fields measured by the sensors 16 and 19 is not zero (condition C0). It is situated at a distance $D19_1$ from the source 8.

The sensor 19 is preferably disposed so that in the absence of flow of the fluid 4 in the pipe 2, the difference between the intensities of the magnetic fields measured by the sensors 16 and 19 is greater than the smaller of these intensities (condition C1). To this end, in this embodiment, $D19_1$ is chosen so that the absolute value of the difference between the distances D16 and $D19_1$ is greater than the smaller of the distances D16 and $D19_1$. The sensors 14, 16 and 19 are connected to a processing unit 18. The processing unit 18 is adapted:

- to calculate the differences between the intensities measured by the sensors 16, 19 and 14, 19, and
- to calculate the speed $v_x$ of flow of the fluid 4 in the direction 7.

Figure 2:
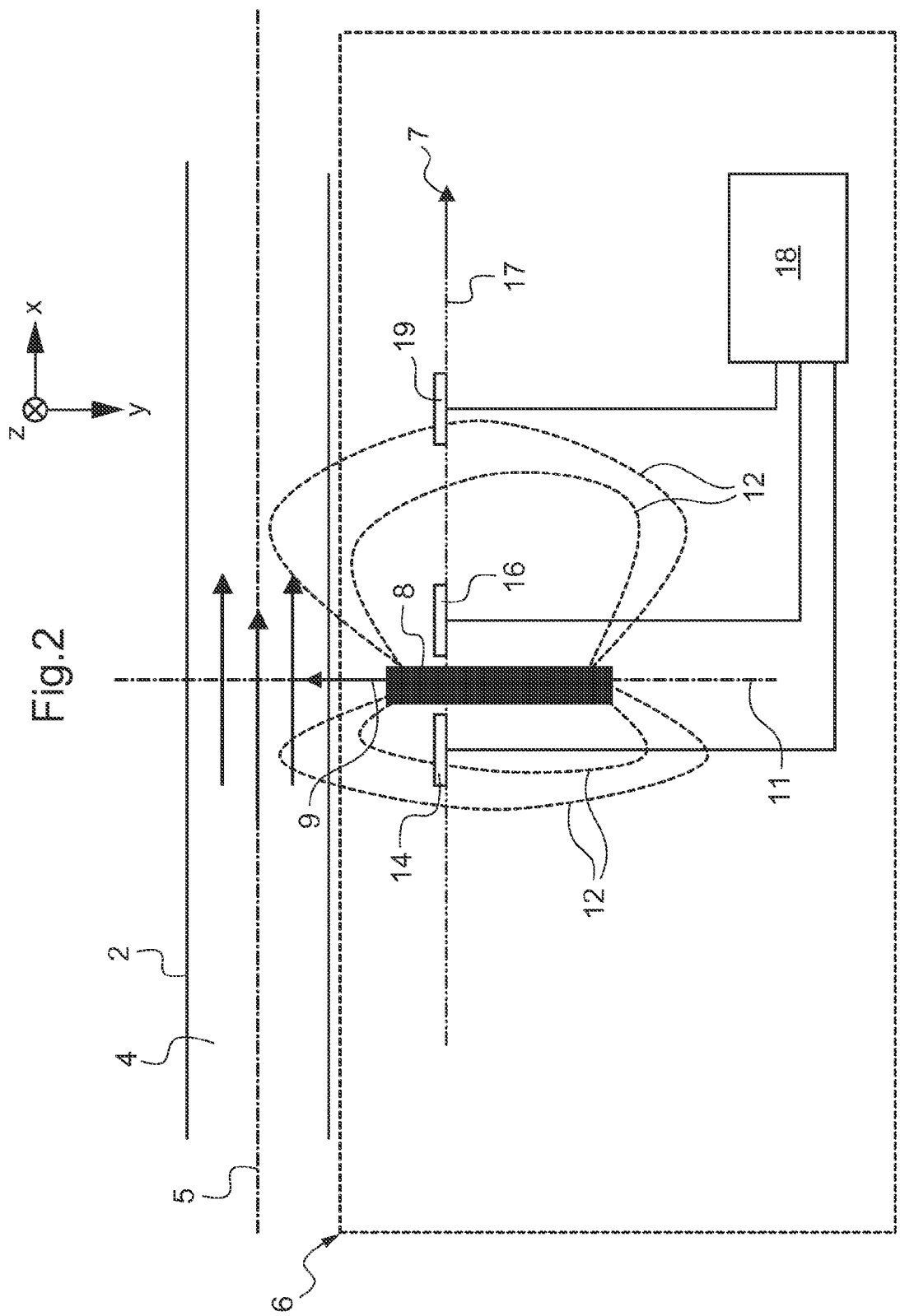
FIG. 2 is a diagrammatic illustration in side view of the velocimeter from FIG. 1 when the speed of flow of the conducting fluid is not zero.

FIG. 2 shows the velocimeter 6 from FIG. 1 when the fluid 4 is flowing in the pipe 2. The movement of the charge carriers of the fluid 4 in a fixed field leads to the appearance of an induced field $B_i$ dependent on the speed of flow $v_x$. The intensities measured by the sensors 14, 16 and 19 are therefore a function of the speed of flow $v_x$.

The operation of the velocimeter 6 will now be described with reference to the FIG. 3 method.

Initially, during a step 70, the velocimeter 6 is calibrated. For example, to this end, in a first time period, during a task 71, the flow of the fluid 4 is stopped. Then, during a task 72, the source 8 radiates the primary magnetic field, the field lines 12 of which pass through the fluid 4.

In parallel, during a task 74, the sensors 14 and 16 measure the intensity of the magnetic field in the absence of flow of the fluid 4 in the pipe 2. The intensities $B_{14permanent}$ and $B_{16permanent}$ of the magnetic field are measured by the sensors 14 and 16, respectively. These intensities $B_{14permanent}$ and $B_{16permanent}$ are defined by the following relations:

$$B_{14permanent}=B_{T14}+B_{S14}$$

$$B_{16permanent}=B_{T16}+B_{S16}$$

in which,
$B_{T14}$ and $B_{T16}$ are the intensities of the exterior magnetic field measured by the sensors 14 and 16, respectively, and
$B_{S14}$ and $B_{S16}$ are the intensities of the primary magnetic field radiated by the source 8 measured by the sensors 14 and 16, respectively.

The exterior magnetic field is a magnetic field that is spatially homogeneous and uniform at the scale of the distances D14, D16 and $D19_1$. This field is produced by a magnetic field source exterior to the velocimeter 6. For example, the exterior magnetic field is the terrestrial magnetic field.

The measured intensities $B_{14permanent}$ and $B_{16permanent}$ are stored by the processing unit 18.

In parallel with the tasks 72 and 74, during a task 76, the sensor 19 measures the intensity $B_{19permanent}$ of the magnetic field. The intensity $B_{12permanent}$ is defined by the following relation:

$$B_{19permanent}=B_{T19}+B_{S19}$$

in which
$B_{T19}$ is the intensity of the exterior magnetic field measured by the sensor 19, and
$B_{S19}$ is the intensity of the primary magnetic field radiated by the source 8 measured by the sensor 19.

The measured intensity $B^{19permanent}$ is stored by the processing unit 18.

Once the intensities $B_{14permanent}$, $B_{16permanent}$ and $B_{19permanent}$ have been measured and stored, during a task 78, the speed of flow of the fluid 4 in the pipe 2 is fixed at a known non-zero speed $v_{1z}$. This speed $v_{1x}$ is fixed by a pump regulated by a velocimeter, for example.

Then during a task 79, the intensities $B_{14}$, $B_{16}$ and $B_{19}$ of the magnetic field are measured by the sensors 14, 16 and 19 and stored in the processing unit. The intensities $B_{14}$, $B_{16}$ and $B_{19}$ are defined by the following relations:

$$B_{14}=B_{T14}+B_{S14}+B_{i14}$$

$$B_{16}=B_{T16}+B_{S16}+B_{i16}$$

$$B_{19}=B_{T19}+B_{S19}+B_{i19}$$

in which $B_{i14}$, $B_{i16}$ and $B_{i19}$ are the intensities of the induced magnetic field measured by the sensors 14, 16 and 19, respectively.

It is these intensities $B_{i14}$, $B_{i16}$ and $B_{i19}$ that are functions of the speed $v_{1x}$. Conversely, the intensities $B_{T14}$, $B_{T16}$, $B_{T19}$, $B_{S14}$, $B_{S16}$ and $B_{S19}$ are independent of the speed $v_{1x}$.

During a task 80, the processing unit 18 subtracts the stored intensities $B_{14permanent}$, $B_{16permanent}$ and $B_{19permanent}$ from the intensities $B_{14}$, $B_{16}$ and $B_{19}$, respectively, to obtain the intensities $B_{i14}$, $B_{i16}$ and $B_{i19}$. For example, the intensities $B_{i14}$, $B_{i16}$ and $B_{i19}$ obtained for the speed $v_{1x}$ are stored by the processing unit 18. During a task 81, the processing unit 18 calculates a slope K of the velocimeter 6. This slope links the intensities $B_{i14}$, $B_{i16}$ and $B_{i19}$ to the speed of flow $v_{1x}$ of the fluid 4. To be more precise, the slope K is that which links the differences between the intensities $B_{i14}$, $B_{i19}$ and $B_{i16}$, $B_{i19}$ to the speed $v_{1x}$.

The proportionality of the speed to these differences is explained with the aid of the following relations. In the remainder of this description, to simplify the explanations and the equations, it is assumed that:
the fluid 4 is incompressible,
the measurements are produced in a continuous regime.

Under these conditions, the equation E1 for the induction of the magnetic field measured by the sensor 16 is as follows:

$$\frac{\partial B_{16}}{\partial t} = -(v \cdot \nabla) \cdot B_{16} = (B_{16} \cdot \nabla) \cdot v + \lambda \cdot \Delta \cdot B_{16} \qquad (E1)$$

in which
$\Delta$ is the Laplace mathematical operator,
$\nabla$ is the gradient mathematical operator, and
v is the speed of flow in the three directions x, y and z, the components of which in these three directions are denoted $v_x$, $v_y$ and $v_z$, respectively.

In the continuous regime, the equation E1 becomes:

$$0=-(v\cdot\nabla)\cdot\overline{B}_{16}+(B_{16}\cdot\nabla)\cdot v+\lambda\cdot\Delta\cdot B_{16}$$

The equation E1 can equally be written in the following manner:

$$0=-(v\cdot\nabla)\cdot(B_{T16}+B_{S16}+B_{i16})+((B_{T16}+B_{S16}+Bi16)\cdot\nabla)\cdot v+\lambda\cdot\Delta\cdot(B_{T16}+B_{S16}+B_{i16})$$

Since the exterior field is uniform and homogeneous in space around the velocimeter 6, we may write:

$$\nabla B_{T16}=0 \text{ and } \Delta B_{T16}=0$$

Moreover, in most cases, the magnetic Reynolds number of the fluid 4 is low with the result that $B_{i16}$ can be neglected compared to $B_{S16}$. Finally, the Laplacian $\Delta B_{S16}$ is negligible outside the source 8. The equation E1 then becomes:

$$0=-(v\cdot\nabla)\cdot B_{16}+((B_{T16}+B_{S16})\cdot\nabla)\cdot v+\lambda\cdot\Delta\cdot B_{T16}$$

Here the term $$\frac{1}{\lambda}\Delta^{-1}(B_{S\underline{16}}\cdot\nabla)\cdot v$$

is neglected given the other terms operative, and the intensity $B_{T16}$ is thus estimated by the following relation:

$$B_{i\underline{16}} = \frac{1}{\lambda}\Delta^{-1}(v\cdot\nabla)\cdot B_{S\underline{16}} - \frac{1}{\lambda}\Delta^{-1}(B_{T\underline{16}}\cdot\nabla)\cdot v$$

In a similar manner, the intensity $B_{i14}$ is estimated using the following relation:

$$B_{i\underline{14}} = \frac{1}{\lambda}\Delta^{-1}(v\cdot\nabla)\cdot B_{S\underline{14}} - \frac{1}{\lambda}\Delta^{-1}(B_{T\underline{14}}\cdot\nabla)\cdot v$$

The same reasoning as above is applied for the sensor 19. Here, the intensity of the primary magnetic field radiated by the source 8 at the level of the sensor 19 is much lower than at the level of the sensor 14 or 16. The intensity of the magnetic field of the source 8 decreases with $1/R^3$, where R is the distance between the source 8 and the point at which the intensity of the magnetic field is measured. For example, if the sensor 19 is disposed as here, so that in the absence of flow of the fluid 4 the difference between the intensities $B_{S14}$ and $B_{S19}$ is greater than $B_{S14}$, then the intensity $B_{S19}$ may be neglected compared to the intensities $B_{T19}$ and $B_{i19}$. The intensity $B_{i19}$ is then estimated by the following relation:

$$B_{i\underline{19}} = -\frac{1}{\lambda}\Delta^{-1}B_{T\underline{19}}\nabla\cdot v$$

A linear function linking the speed of flow of the fluid 4 and the intensities $B_{i14}$, $B_{i16}$ and $B_{i19}$ is as follows, for example:

$$B_{i\underline{14}} - B_{i\underline{19}} = \frac{1}{\lambda}\Delta^{-1}(v\cdot\nabla)\cdot B_{S\underline{14}} - \frac{1}{\lambda}\Delta^{-1}(B_{T\underline{14}}\cdot\nabla)\cdot v + \frac{1}{\lambda}\Delta^{-1}B_{T\underline{19}}\nabla\cdot v$$

As the terrestrial field is uniform in space around the velocimeter 6, the intensities $B_{T14}$ and $B_{T19}$ are equal, Consequently, the preceding relation becomes:

$$B_{i\underline{14}} - B_{i\underline{19}} = \frac{1}{\lambda}\Delta^{-1}(v\cdot\nabla)\cdot B_{S\underline{14}}$$

Accordingly, the difference between the intensities $B_{i14}$ and $B_{i19}$ makes it possible to eliminate or reduce the influence of the term $$-\frac{1}{\lambda}\Delta^{-1}(B_{T\underline{14}}\cdot\nabla)\cdot v.$$

This increases the linearity of the velocimeter 6 by eliminating or reducing its dependency on the gradient of the speed of flow.

Using the same reasoning, we can write:

$$B_{i16} - B_{i19} = \frac{1}{\lambda}\Delta^{-1}(v\cdot\nabla)\cdot B_{S\underline{16}}$$

Here the following linear equation E3 is used linking the speed of flow v of the fluid 4 in the directions x, y and z and the intensities $B_{i14}$, $B_{i16}$ and $B_{i19}$:

$$B_{i16}+B_{i14}-2B_{i19}=\underline{K}\cdot v \qquad \text{(equation E3)}$$

in which $$\underline{K} = \frac{1}{\lambda}\Delta^{-1}\cdot\nabla\cdot(B_{S\underline{16}} + B_{S\underline{14}})$$

The slope K in the equation E3 can be calculated or determined experimentally. Here, during the task 81, it is determined experimentally on the basis of the known speed $v_{1x}$ and the measured values of the intensities $B_{i14}$, $B_{i16}$ and $B_{i19}$. The slope K is therefore determined on the basis of measurements at known speed.

The step 70 is preferably performed more than once with known speeds covering the range of speeds that it is required to measure. Thereafter, on each repetition, the slope K obtained is averaged with the values of slopes K obtained before.

After being calibrated, there follows a step 84 of using the velocimeter 6. During the step 84, the fluid 4 flows in the pipe 2 at an unknown speed which is denoted $v_i$ in the remainder of the description.

Initially, during a task 86, the sensors 14, 16 and 19 measure the intensities $B_{14}$, $B_{16}$ and $B_{19}$ of the magnetic field.

Then during a task 88, the intensities $B_{i14}$, $B_{i16}$ and $B_{i19}$ are calculated from the intensities $B_{14}$, $B_{16}$ and $B_{19}$ as described for the task 80.

During a task 90, the processing unit calculates the speed of flow $v_{ix}$ of the fluid 4 from $B_{i14}$, $B_{i16}$ and $B_{i19}$ and the slope K determined during the step 70. For example, the following relation is used for this:

$$v_{ix}=(B_{i16}+B_{i14}-2B_{i19})/K$$

Adding the intensities $B_{i14}$ and $B_{i16}$ increases the sensitivity of the velocimeter 6 while subtracting the intensity $B_{i19}$ from each intensity $B_{i14}$ and $B_{i16}$ increases its linearity and reduces its dependence on the exterior magnetic field.

Figure 4:
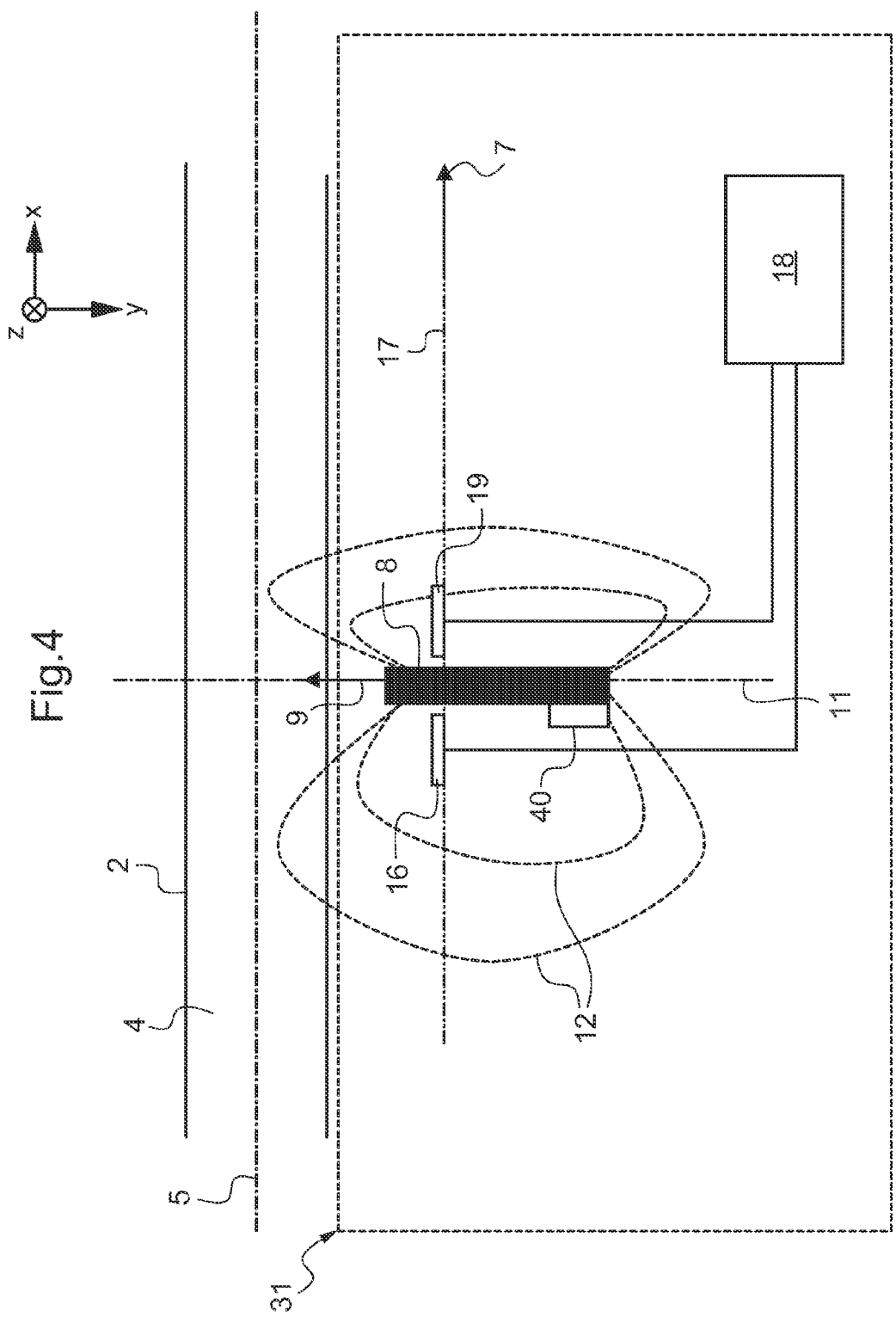
FIG. 4 is a diagrammatic illustration in side view of a first variant of the velocimeter from FIGS. 1 and 2.

FIG. 4 shows a velocimeter 31 identical to the velocimeter 6 except that the velocimeter 31 includes a magnetic disturber 40. By magnetic disturber is meant any element adapted to deform the field lines 12 of the source 8. The function of the disturber 40 is to deform the field lines 12 of the source 8 so that to verify the condition C0 it is no longer necessary to space the sensor 19 from the source 8 at a distance $D19_1$ different from the distance D16. As the field lines are asymmetrical because of the introduction of the disturber 40, the sensor 19 can be moved closer to the source 8 whilst satisfying the condition C0. Here the disturber 40 eliminates the symmetry of the field lines 12 with respect to the plane passing through the axis 11 and parallel to the directions y and z. The velocimeter 31 is therefore more compact than the velocimeter 6.

Figure 5:
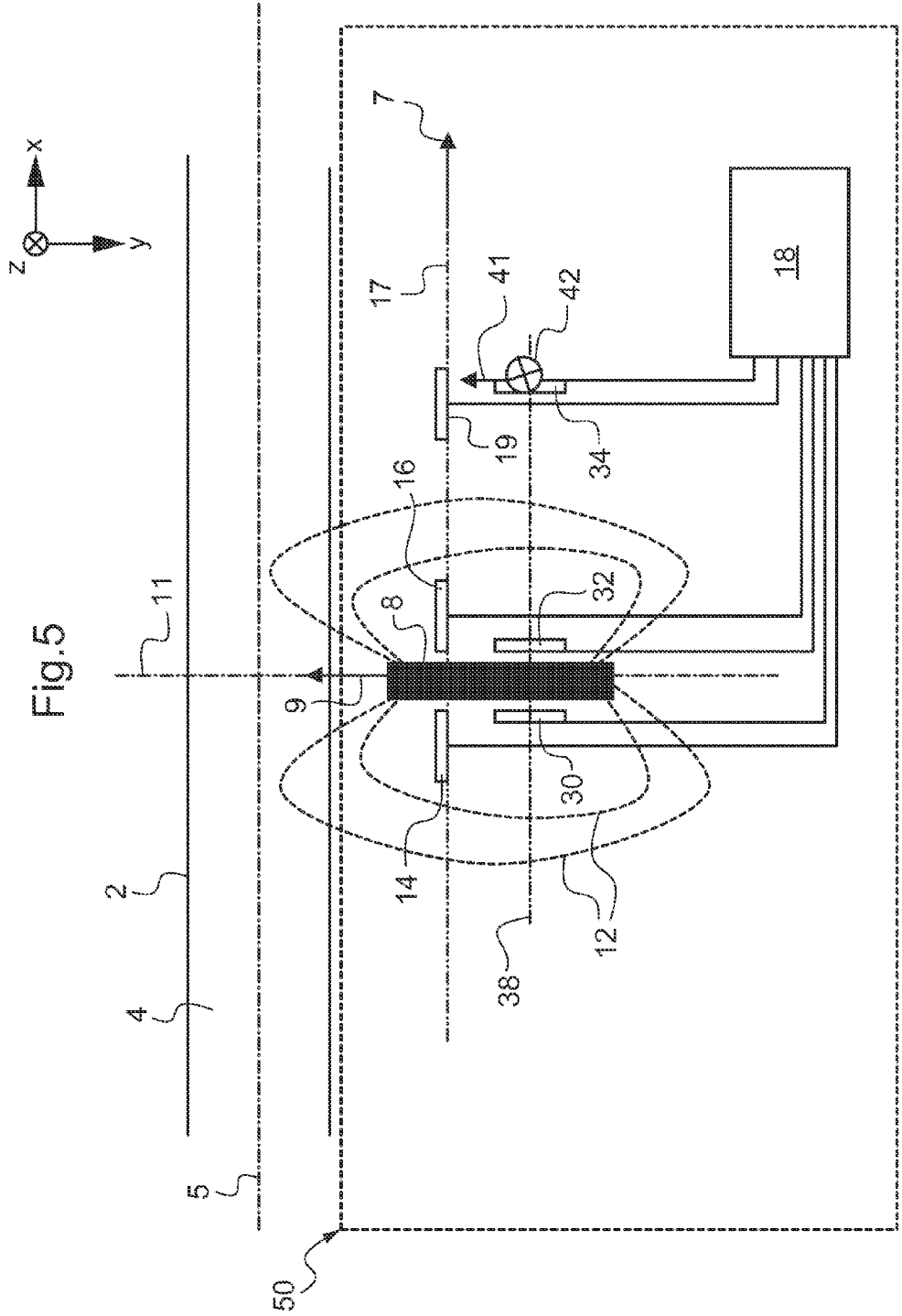
FIG. 5 is a diagrammatic illustration in side view of a second variant of the velocimeter from FIGS. 1 and 2.

For example, the disturber 40 is a permanent magnet juxtaposed to the source 8. In this case, to eliminate the symmetry of the field lines 12, the magnetization axis of the disturber 40 carrying its magnetic moment must not coincide with the axis 11 of the source 8. Here, the magnetic moment of the disturber 40 is oriented in a direction different from that of the source 4. For example, the magnetic moment of the disturber 40 is directed in a direction opposite to that of the source 8. The disturber 40 is disposed nearer the sensor 16 than the sensor 19. Here, the sensor 19 is positioned at a new distance $D19_2$ from the source 8. The distance $D19_2$ is preferably less than the distance $D19_1$ in the velocimeter 6. In this embodiment, the sensor 14 has been omitted. Here, the sensor 19 is disposed on one side of the source 8 and the sensor 16 is disposed on the other side. The distances D16 and $D19_2$ are equal, for example, FIG. 5 shows a velocimeter 50 identical to the velocimeter 6 except that it is designed to measure the speed of flow in three different directions. It is therefore preferentially intended to be used to measure the speed of the flow of a fluid inside a pipe enabling a plurality of directions of flow. To this end, the velocimeter 50 is equipped with third, fourth and fifth sensors 30, 32 and 34. The sensors 30, 32 and 34 are two-axis sensors. They measure the intensity of the magnetic field in measurement directions 41 and 42 parallel to the directions y and z, respectively. The sensors 30, 32 and 34 are aligned with an axis 38 perpendicular to the magnetization axis 11 of the source 8, for example.

The sensors 30 and 32 are situated on respective opposite sides of the source 8 at distances D30 and D32, respectively. Here, the sensors 30 and 32 are disposed so that in the absence of flow of the fluid 4, the intensities measured by the sensors 30 and 32 are equal. To this end, the distances D30 and D32 are equal. The sensors 30 and 32 are Hall-effect probes, for example.

The sensor 34 is situated at a distance D34 from the source 8. It is disposed so that in the absence of flow of the fluid 4 in the pipe 2, the difference between the intensities of the magnetic fields measured in the directions z and z by the sensors 32 and 34 is not zero. It is preferably disposed so that in the absence of flow of the fluid 4 in the pipe 2, the difference between the intensities of the magnetic fields measured by the sensors 32 and 34 is greater than the smaller of these intensities. To this end, the distance D34 is chosen here so that the absolute value of the difference between the distances D32 and D34 is greater than the smaller of the distance D32 and D34, The sensors 30, 32 and 34 are connected to the processing unit 18. The processing unit 18 calculates the differences between the intensities measured by the sensors 30, 34 and 32, 34 and calculates the speeds of flow $v_{iy}$ and $v_{iz}$ of the fluid 4 in the measurement directions 41 and 42, respectively.

The operation of the velocimeter 50 is similar to that of the velocimeter 6 except that the speed of the fluid is calculated in the three measurement directions 7, 41 and 42. In particular, the calibration and the calculation of the speeds $v_{iy}$ and $v_{iz}$ are deduced from the explanations given for the calculation of the speed $v_{ix}$.

FIG. 6 shows a velocimeter 95 identical to the velocimeter 50 except that the sensors 14, 16, 19, 30, 32 and 34 are replaced by three-axis sensors 96 and 98 each adapted to measure the intensity of the magnetic field in three mutually orthogonal measurement directions 97, 99 and 101. Here, the sensors 96 and 98 are disposed on the same side of the source 8. That is to say they are located on the same side of a plane passing through the magnetization axis 11 of the source 8 and parallel to the directions y and z.

The operation of the velocimeter 95 is deduced from the operation of the velocimeter 6 except that only one measurement of the intensity of the magnetic field is effected in the vicinity of the source as against two for the velocimeter 6. This velocimeter 95 measures the speed of flow in the three measurement directions of the sensors 96 and 98.

Numerous other embodiments are possible. For example, the primary magnetic field source 8 can be replaced by any sort of intense magnetic field localized source. By localized source is meant a source that generates a magnetic field that is not spatially homogeneous on the scale of the distances between the sensors of the velocimeter. For example, the source 8 can be a conducting or superconducting coil. The source 8 can be a continuous or alternating magnetic field source.

The velocimeter is not limited to measurement of the speed of flow of liquid gallium. The flow of any electrically conducting fluid can be measured. For example, the velocimeter can be used to measure the speed of flow of a plasma.

In another embodiment, the primary magnetic field is modulated by a predetermined modulating signal and the intensities measured by the sensors 14, 16, 19, 30, 32 and 34 or 96 and 98 are demodulated with the aid of the modulating signal. A synchronous detection process is then used. For example, the detection of the magnetic field is effected as in flux gate sensors.

The measurement of the intensity of the magnetic field may be effected by any system for measuring magnetic field or flux. For example, the sensors 14, 16, 30, 32, 34, 96 or 98 may be replaced by magnetoresistors, Mirnov coils, Zeeman-effect sensors or flux gates.

The number of magnetic field sensors in the velocimeter 6 is not limited to two or three; it may be greater than or equal to four.

The axis 17 or 38 does not necessarily pass through the source 8.

Alternatively, to be as close as possible to the fluid to measure the speed of flow, a housing is provided in the walls of the pipe to receive the velocimeter.

The magnetic disturber is not necessarily a permanent magnet. Any element, the magnetic permeability of which is not equal to 1, may be used as the magnetic disturber. For example, there may be used for the disturber 40 elements in magnetic material such as ferromagnetic or ferrimagnetic materials.

It is not necessary for the condition C1 to be complied with. For example, the sensor 19 can be close or very close to the sensor 16. In this case, the intensity $B_{S19}$ is not necessarily negligible compared to the intensity $B_{T19}$. This can limit the sensitivity of the sensor but does not prevent improvement of its linearity. To the contrary, in some cases, given that the sensors 16 and 19 are closer together, the term $B_{i19}$ measured by the sensor 19 is closer to the term $$-\frac{1}{\lambda}\Delta^{-1}(B_{T\underline{16}} \cdot \nabla) \cdot v.$$

The speed of the fluid in vertical alignment with the sensors 16 and 19 is strictly identical, which improves the linearity of the velocimeter. The FIG. 3 method is not limited to measuring the speed of flow of incompressible fluids. The use of the velocimeter 6 for weakly compressible fluids is perfectly feasible.

Figure 3:
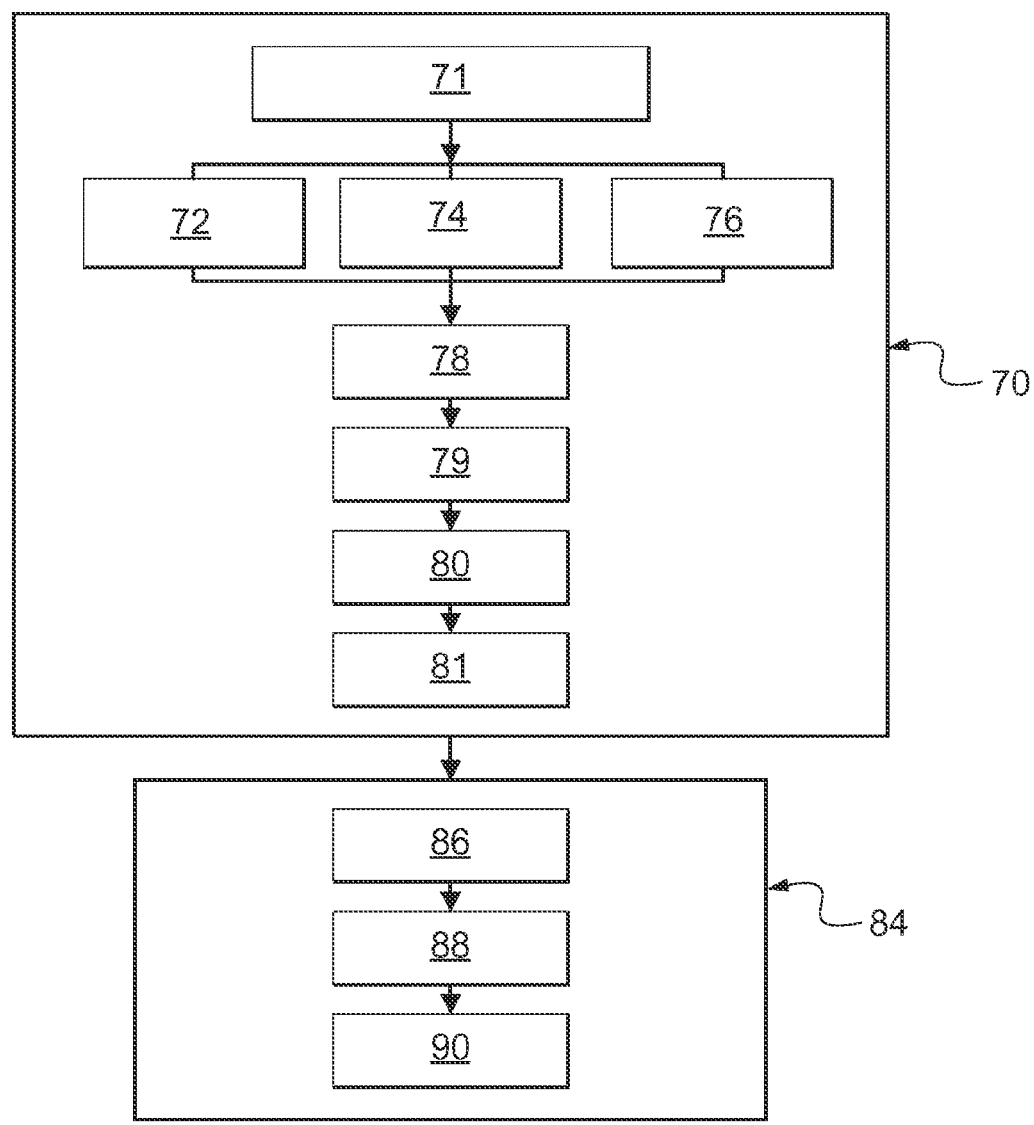
FIG. 3 is a flowchart of the method of measuring the speed of flow of a conducting fluid with the aid of the velocimeter from FIG. 1.

During the step 70 of the FIG. 3 method, if the flow of the fluid in the pipe cannot be stopped, it is possible to carry out the calibration of the velocimeter by moving the velocimeter sufficiently far away for the intensity of the induced magnetic field measured by the sensors 14, 16 and 17 to be negligible compared to the intensity of the permanent magnetic field measured by the same sensors. In this case, this step is carried out in the factory in which the velocimeter is manufactured, for example, preferably at a temperature close to its temperature of use when it is fixed to the pipe.

Finally, the invention is not limited to the situation where the fluid is guided in a pipe. Any container containing a conducting liquid can be associated with the velocimeter of the invention.

The invention claimed is:

1. An apparatus for measuring flow speed of an electrically conducting fluid, said apparatus comprising a velocimeter, wherein said velocimeter comprises a source of a primary magnetic field, said primary magnetic field having field lines that pass through said electrically conducting fluid, first and second magnetic field sensors, each of which measures corresponding first and second intensities of said magnetic field in a first measurement direction, said first and second magnetic field sensors being disposed such that, in absence of flow of said electrically conducting fluid, a difference between said first and second intensities is non-zero, and a processing unit adapted to calculate, based at least in part on said difference, a flow speed of said electrically conducting fluid in a direction parallel to said first measurement direction.

2. The apparatus of claim 1, wherein said first and second magnetic field sensors are disposed such that, in absence of flow of said electrically conducting fluid, said difference between said first and second intensities is greater than the smaller of said first and second intensities.

3. The apparatus of claim 1, wherein said source has a magnetization axis, and wherein said first and second magnetic field sensors are disposed on the same side of a plane containing said magnetization axis.

4. The apparatus of claim 1, wherein said first magnetic field sensor is situated at a first distance from said source and said second magnetic field sensor is situated at a second distance from said source, and wherein an absolute value of a difference between said first and second distances is greater than the smaller of said first and second distances.

5. The apparatus of claim 1, further comprising a magnetic disturber disposed closer to said first magnetic field sensor than to said second magnetic field sensor so that, in the absence of flow of said electrically conducting fluid, said first intensity is at least double said second intensity.

6. The apparatus of claim 5, wherein said first and second magnetic field sensors are equidistant from said source.

7. The apparatus of claim 1, wherein said velocimeter comprises a third magnetic field sensor, said third magnetic field sensor being adapted to measure a magnetic field in said first measurement direction, said third magnetic field sensor being disposed relative to said source so that intensities measured by said first magnetic field sensor and said third magnetic field sensor are equal in the absence of flow, and wherein said processing unit is adapted to calculate a speed of flow of said electrically conducting fluid based at least in part on a sum of a first difference and a second difference, said first difference being a difference between intensities measured by said first and second magnetic field sensors, and said second difference being a difference between intensities measured by said second and third magnetic field sensors.

8. The apparatus of claim 7, wherein said velocimeter comprises a fourth magnetic field sensor and a fifth magnetic field sensor for measuring an intensity of said magnetic field in at least one second measurement direction intersecting said first measurement direction, and wherein said processing unit is adapted to calculate a speed of flow of said electrically conducting fluid in said second measurement direction of said fourth and fifth magnetic field sensors based at least in part on a difference between intensities measured by said fourth and fifth magnetic field sensors.

9. The apparatus of claim 1, wherein said source comprises an alternating magnetic field source.

10. The apparatus of claim 1, wherein said primary magnetic field is modulated by a predetermined modulating signal and wherein said intensities measured by said magnetic field sensors are demodulated with the aid of said predetermined modulating signal.

11. A method of measuring the speed of flow of an electrically conducting fluid through which field lines of a primary magnetic field pass, said method comprising measuring an intensity of said magnetic field in a first measurement direction using first and second magnetic field sensors disposed so that, in absence of flow of said electrically conducting fluid, a difference between intensities measured by said first and second magnetic field sensors is non-zero, and calculating a speed of flow from a difference between said intensities measured by said first and second magnetic field sensors.

* * * * *